Nov. 2, 1965

C. E. McCRACKEN 3,215,451

METHOD AND APPARATUS FOR RECORD KEEPING

Filed July 2, 1962

INVENTOR.
Charles E. McCracken
BY
William S. Dorman
ATTORNEY

Nov. 2, 1965    C. E. McCRACKEN    3,215,451
METHOD AND APPARATUS FOR RECORD KEEPING
Filed July 2, 1962    2 Sheets-Sheet 2

INVENTOR.
Charles E. McCracken
BY
William S. Dorman
ATTORNEY

United States Patent Office 3,215,451
Patented Nov. 2, 1965

3,215,451
METHOD AND APPARATUS FOR
RECORD KEEPING
Charles E. McCracken, 1606 S. Utica, Tulsa, Okla.
Filed July 2, 1962, Ser. No. 206,699
2 Claims. (Cl. 281—44)

This invention relates to improvements in apparatus and methods for control systems and more particularly, but not by way of limitation, to an improved method and apparatus for record keeping for correlating data and facilitating reference to the recorded information.

In many present day business offices the systems of record keeping are either extremely complicated, requiring many man hours for posting of the information, and particularly trained personnel for handling the data, or the systems are entirely inadequate for the purposes demanded of the record keeping system. This is particularly true in many professional business offices, such as a dentist's office, or the like, wherein a plurality of clients or patients require call-back services, or an attorney's office wherein it is necessary to enter information on a docket or calendar to be handled at a particular date in the future. In the relatively small offices often associated with a professional service, it is very difficult to keep adequate detailed records since there is usually a limited number of helpers or personnel, and the work of the office tends to consume a maximum of the manpower time available, leaving an inadequate handling of the records. As a result, call-backs are often overlooked, and as a consequence valuable clients, or business may be lost, which may reduce the income of the office and further complicates the problem.

The present invention contemplates a novel method and apparatus for greatly facilitating the record keeping in a business office in such a manner that the entire procedure may be handled with a minimum of time and effort. The overall system may be correlated and integrated quickly and easily to provide a complete control of the operations of the office, including not only personal information regarding the clients, or work to be done in association therewith, but also accounting records, and substantially any other pertinent data which is desirable to maintain in association with the business of the office. The apparatus is particularly designed to correlate daily events or information with a general ledger wherein an overall record is provided of the particular transaction, or the like. The improved method provides a ready reference for producing substantially any desired information necessary to the efficient function of the business office, and yet reduces the man hours required for recording of the information to a minimum. The control system substantially eliminates accidental overlooking of any important future action to be taktn, and keeps the overall office operation constantly at the fingertips of the business manager, operator or owner. The novel method and apparatus is simple and efficient in operation, and provides an economy in overall business procedure or record keeping requirements.

It is, therefore, an important object of this invention to provide a novel method and apparatus for facilitating the efficient control of record keeping operations of a business office.

It is another object of this invention to provide a record keeping method for effecting an overall correlation of required data for a work operation.

Another object of this invention is to provide an apparatus for facilitating the record keeping of a work operation wherein data may be selected from the records with a minimum of effort and with maximum accuracy.

Still another object of this invention is to provide an apparatus particularly designed and constructed for facilitating entry of data in a record keeping system.

A still further object of this invention is to provide an apparatus for storing compiled data in a manner facilitating reference thereto and the addition of information therein.

Other and further objects and advantageous features of the present invention will hereinafter more fully appear in connection with the detailed description of the drawings in which.

Figure 1:
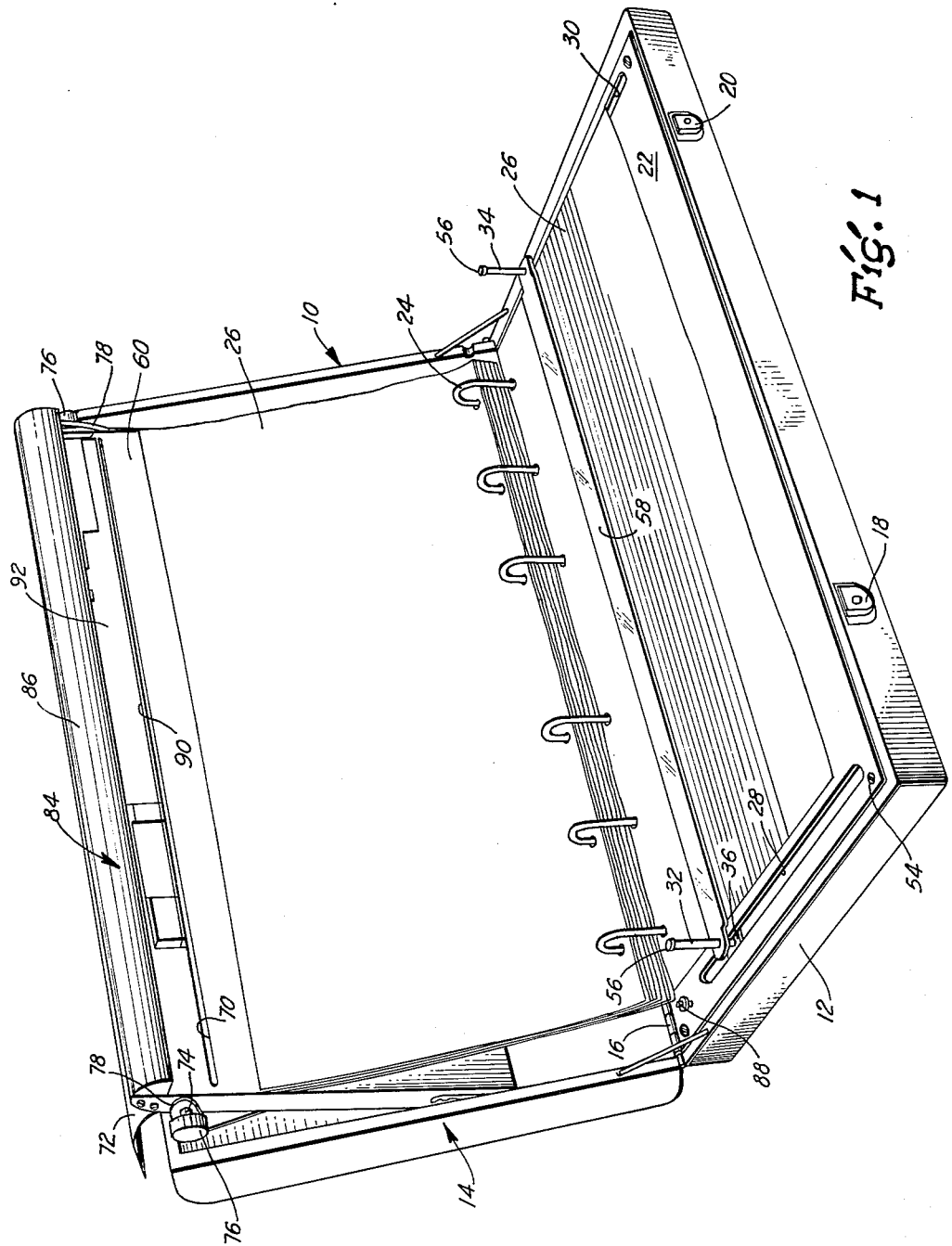
FIGURE 1 is a perspective view of a record keeping apparatus embodying the invention.

Referring to the drawings in detail, reference character 10 generally indicates a record keeping apparatus comprising a base member or housing 12 which may be of a portable type, but not limited thereto. However, as depicted herein, the housing 12 is provided with a cover portion 14 hingedly secured thereto at 16 in any well known manner whereby the entire unit 10 may be closed into a compact package for transportation thereof. Of course, suitable latching members 18 and 20 are preferably provided on the housing 12 for cooperating with complementary latching members (not shown) provided on the cover 14 for securing the unit 10 in the closed position to preclude accidental opening thereof during transportation or the like.

The housing 12 may be of a substantially box type construction having an upper plate or surface 22 which is relatively flat to provide a work area, as will be hereinafter set forth. A plurality of U-clamp members 24 are spaced along the rear portion of the surface 22 which may be opened and closed in much the same manner as a ring binder loose leaf notebook, or the like. One leg of the clamps 24 may be unlatched in the usual manner and the clamps may be pivoted about the other leg thereof whereby a plurality of punched record keeping sheets or ledger sheets 26 may be disposed thereon, as is well known. Substantially any desired number of work sheets 26 may be disposed or stored on the clamps 24, and may be quickly and easily moved thereon to provide access to the required sheet 26 in order to collect data therefrom, or enter information thereon, as will be hereinafter set forth.

Figure 3:
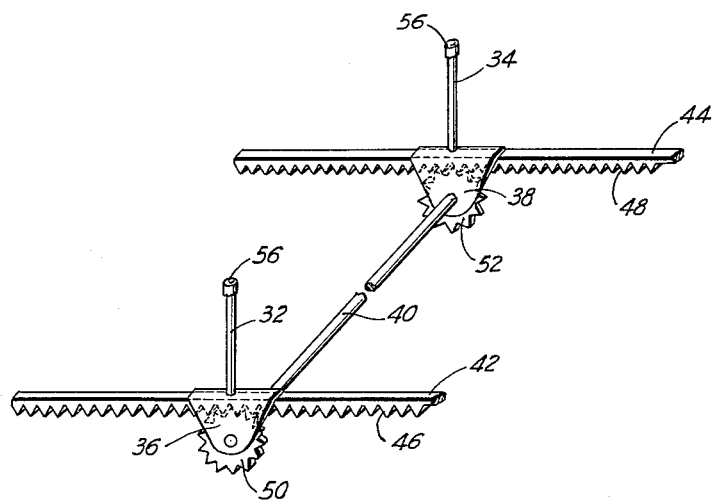
FIGURE 3 is a perspective view of a rack and gear mechanism such as may be used in the apparatus of the invention.

The upper plate 22 is provided with a pair of spaced parallel slots 28 and 30 having upstanding posts 32 and 34, respectively, movably mounted therein. The posts 32 and 34 may be connected in any suitable manner for simultaneous movement, and as depicted in FIGURE 3, the posts 32 and 34 are carried by brackets 36 and 38, respectively, which are rigidly secured to a shaft member 40 extending therebetween. The brackets 36 and 38 are slidably mounted on rails or racks 42 and 44, respectively, having longitudinally extending teeth or notches 46 and 48 provided on the lower edge portions thereof. A gear member 50 is suitably journalled on the bracket 36 for meshing with the teeth 46 upon movement of the post 32 along the respective rail 42, and a similar gear 52 is journalled on the bracket 38 for meshing with the teeth 48 in a simultaneous action with the gear 50 whereby the posts 32 and 34 may move along the respective rails 42 and 44 in synchronization.

The rails 42 and 44 are mounted in the housing 12 in any suitable manner (not shown) and are in substantial alignment with the slots 28 and 30 whereby the posts 32 and 34 extend upwardly therethrough. Of course, the plate 22 may be removably secured to the housing 12 in any well known manner, such as by a plurality of screws 54, to provide access to the interior of the housing 12, if desired.

A removable head member 56 is provided for each post member 32 and 34 to retain a rule or straight edge member 58 on the posts. The rule member 58 is slidably disposed on each post 32 and 34 and extends therebetween, as clearly shown in FIGURE 1. The rule member 58 may be elevated on the posts 32 and 34 with respect to the surface 22 for accommodating substantially any desired number of the sheets 26 therebetween. In addition, the rule may be moved manually along the exposed surface of the topmost sheet 26 disposed thereunder whereby the posts 32 and 34 will be moved simultaneously in the respective slots 28 and 30 for maintaining the rule 58 in mutually parallel dispositions during movement along the sheets 26. The connecting means between the posts 32 and 34 maintain the posts in synchronization and provides for ease of movement of the rule or straight edge member 58 in either transverse direction along the sheet 26. Thus, the rule 58 may be quickly and easily moved to substantially any desired position on the sheet 26 for facilitating the inscription of information thereon, or for the discovering of information previously recorded thereon.

Figure 2:
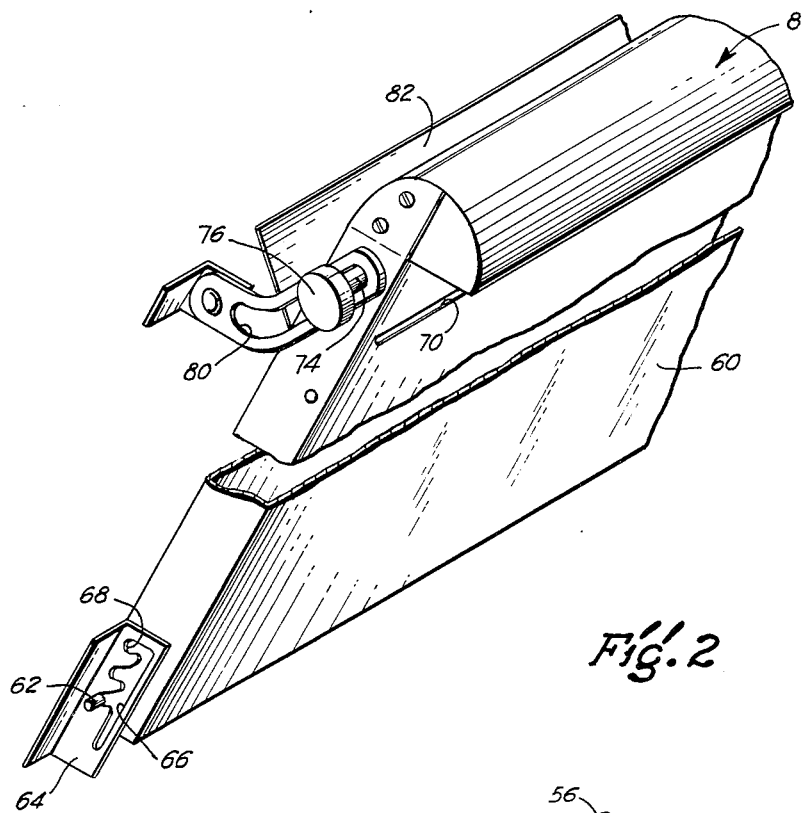
FIGURE 2 is a broken perspective view of a portion of the apparatus depicted in FIGURE 1.

The cover or lid portion 14 is preferably of a substantially box type construction and is provided with an inner housing 60 pivotally arranged therein. As hereinbefore set forth, the particular embodiment depicted herein is a portable structure and the inner housing 60 is pivotally arranged for facilitating closing of the lid 14 against the housing 12 without interference therefrom. However, it is to be understood that the inner housing may be rigidly fixed with respect to the apparatus 10, if desired. The housing 60 may be pivotally secured within the lid 14 in any well known manner, such as pivot pins 62 and cooperating bracket members 64, only one each of which is depicted in FIGURE 2. The brackets 64 may be provided with an elongated slot 66 having a plurality of pockets 68 extending therefrom for receiving the pin 62 therein whereby a plurality of angularly disposed positions may be provided for the inner housing 60, as is well known.

An elongated slot 70 is provided in at least one surface of the inner housing 60 and is preferably disposed in the proximity of the upper edge thereof. A platen member (not shown) is journalled in the inner housing 60 behind or substantially adjacent the slot 70, and the upper end of the inner housing 60 is open whereby a suitable data sheet 72 may be inserted therethrough and brought into engagement with the platen in the well known manner whereby selected portions of the data sheet 72 will be visible through the slot 70. The central shaft member 74 of the platen extends through the opposed sides of the inner housing 60 for receiving suitable knob members 76 for facilitating manual rotation of the platen. The inner housing 60 is further secured to the lid 14 by means of a pair of spaced angled brackets 78 having a slot or opening 80 (FIGURE 2) therein for receiving the opposed ends of the shaft 74. The slot 80 cooperates with the shaft 74 for stabilizing the inner housing 60 within the lid portion 14 at the desired preselected angular position therefor, as is well known in this type of structure. In addition, a rearwardly extending angularly disposed plate 82 may be pivotally secured to the rear portion of the housing 60 in the proximity of the platen member for directing the sheet 72 upwardly and rearwardly from the platen as the sheet 72 is moved through the apparatus 10 thereby.

A lighting mechanism generally indicated at 84 is carried by the inner housing 60 in the proximity of the upper portion thereof for facilitating viewing of the information visible through the slot 70. The lighting mechanism 84 may be of any desired type, and as depicted herein comprises an arcuate guard member or housing 86 extending across the housing 60 for supporting an elongated electrical bulk (not shown). The bulb is electrically connected with a suitable switch member 88 (FIGURE 1) whereby the bulb may be energized or de-energized as desired. Of course, the electrical system may be of a type adapted for connection with the usual house current, or may be of a self-contained battery type, or the like.

A suitable track or holder member 90 is secured to the housing 60 immediately above the slot 70 for removably supporting a suitable scale member 92. The scale member 92 is particularly selected for corresponding with the data recorded on the sheet 72 for facilitating selecting the data visible through the slot 70 for recording onto the proper sheet 26. A plurality of scale members 92 may be provided for corresponding to a plurality of data sheets 72, and the scale members 92 may be interchanged on the rail or holder member 90 in accordance with the particular data sheets 72 being used, as will be hereinafter set forth in detail.

The sheets 26 may be suitably ruled in accordance with any desired information to be recorded thereon. For example, a plurality of longitudinally extending lines may be provided along the entire length of the sheets 26 for recording desired information along a single longitudinally extending space for facilitating correlation thereof. In addition, a plurality of transversely extending lines may be ruled on the sheets 26 for dividing each longitudinal space thereon into a plurality of variable sizes, thus providing a plurality of columns on the sheet for recording data. The sheets may be so ruled as best required for the particular record keeping system to be utilized with the apparatus 10. Each longitudinally extending line may be provided for an individual client's name, patient's name, or the like, and the plurality of divisions along the respective longitudinal space may be utilized for recording all pertinent information relating to the particular client or patient. In another instance, each longitudinally extending line may be utilized for inventory recording data, with the plurality of divisions therealong utilized for recording all pertinent data relating thereto. In the overall procedure, the sheets 26 are preferably utilized for general summary sheets, and will efficiently provide a complete overall resume of the business operation being controlled by the system.

The sheets 72 may be similarly ruled in accordance with any desired information in accordance with the business operation being recorded. It is preferable that the sheets 72 be particularly designed and arranged for having daily events recorded thereon and each sheet 72 will thus contain information relating to the every day events that are to be transferred to the general ledger sheets 26. For example, in the case of a professional type business, the particular work operation relating to various clients or patients may be recorded in the appropriate space on the sheets 72, and in the case of an inventory record, or the like, events relating to the handling or transfer of merchandise during the day may be appropriately recorded on the daily record sheet 72.

*Operation*

While the particular control system disclosed herein relates to a dentist's office procedure, it is to be understood that the novel method and apparatus may be utilized with substantially any type of business wherein it is desirable to retain overall records of the transactions.

The daily record sheets 72 may be ruled with a plurality of longitudinally extending lines to provide longitudinally extending spaces for the recording of a patient's name on each line. In addition, it is desirable to provide space for the date on which the information to be recorded thereon occurs. The sheet 72 may be further divided into a plurality of variably spaced vertical or transverse columns having headings indicated thereon for a plurality of work operations in connection with each particular patient. For example, column headings such as "amount received," "last payment date," "amount last payment," "new balance" may be provided for recording information relating to statement data for the patient, and each payment received during the day being recorded may be entered on the sheet 72, along with the particular patient's name making the payment. Additional headings may be provided on the daily record sheet 72, such as "cancelled," "re-appointment date," "special letters to send," and other headings indicating the type of work performed on the patient, or work yet to be done on the patient. Of course, the headings for the columns may be selected to best include the data required for the dentist, or the like, using the system and apparatus. Furthermore, it may be desirable to provide a daily sheet 72 particularly designed for recording daily money receipts and payments, and a separate sheet 72 designed for recording daily work operations on the patient. However, a rule 92 is designed to correspond to the column headings for each differently inscribed daily sheet 72, with the particular rule 92 corresponding to the sheet 72 being used for transferring the daily records onto the general sheets 26 used in conjunction therewith.

The general ledger sheets 26 such as utilized for a dentist's records may be provided with a plurality of longitudinaly extending lines for dividing the sheet into longitudinal spaces for receiving each patient's name. It is also preferable to provide a plurality of vertical or transverse columns on each sheet 26 for recording substantially all information relating to the patient. It is also preferable to provide transverse columns on the sheets 26 indicating the days of the month whereby a mark may be made in the proper column for the particular day of a month in which a patient is to require work in the future. Thus, future dates as well as past work done on the patient may be readily called to mind upon an inspection of the general ledger sheets. It is also desirable to provide a column for an individual patient number which is assigned to each individual patient, and each work operation or information relating to the patient may be identified with his particular number. The rule 58 is provided with data inscribed thereon complementary to the column headings of the sheets 26 for facilitating identification of data on the sheets 26.

In order to record information from the various daily record sheets 72 onto the proper general ledger sheet 26, the particular daily sheet 72 is inserted adjacent the platen member carried by the inner housing 60 and is rolled therethrough in the usual manner until the first longitudinal line or space on the sheet 72 is visible through the slot 70. The proper rule member 92 is then disposed on the rail 90 whereby the corresponding headings thereon will be in substantial alignment with the proper column visible through the slot 70. The slot 70 is so arranged as to permit visual inspection of one entire line of the sheet 72 at a time, and the patient indicated through the slot 70 may be quickly located on the proper general ledger sheet 26. The sheet 26 thus selected may be disposed on the surface 22 beneath the movable rule 58, and the rule 58 may be quickly and easily moved therealong for disposition in alignment with the particular line having the selected patient's data contained thereon. With the proper line thus selected, the information visible through the slot 70 may be manually recorded in the proper column of the selected sheet 26.

The platen may then be rotated in a direction for advancing the sheet 72 whereby the next longitudinal line or space thereon is brought into alignment with the slot 70, and the operation of transferring the information onto the respective sheet 26 may be repeated. Of course, the operation may be continued until all of the daily information is transferred to the general ledger sheets 26.

In order to prepare a work sheet for work to be done the next succeeding day in the dentist's office, the operation is substantially reversed. Beginning with the first of the sheet 26, the rule 58 is moved downwardly therealong, and the operator may ascertain at a glance each and every operation to be conducted during the next day's business hours. As the rule 58 is moved downwardly along the sheets 26, the rule 58 is moved downwardly therealong, ing to the particular day of the month indicates that patient's record should be checked. For example, if the next succeeding day is the fifth day of the month, every mark in the column for the fifth day of the month indicates that this patient's record should be checked for work on that particular day. A glance across the line indicated by the rule 58 in alignment with the patient will quickly indicate any work to be done that patient on the fifth of the month. This information detected may be entered on a suitable record sheet particularly designed for setting forth work to be performed on a work day. All of the ledger sheets 26 may be quickly scanned in this manner, and the record sheet for indicating the work to be performed on the next succeeding day may be completed.

Thus, near the close of each work day, the work having been accomplished during the day may be quickly and accurately entered onto the ledger sheets 26 through the use of the device 10, and similarly, the ledger sheets 26 may be quickly and efficiently scanned for selecting all of the work to be performed on the next succeeding day. At the beginning of each work day, a complete outline of the day's activities will be at hand, and may be deleted as accomplished or completed. Of course, any activities not completed may be carried over to the next day's record sheet.

From the foregoing, it will be apparent that the present invention provides a novel method and apparatus for correlating a record keeping system for substantially any type of business function. Daily happenings and events may be recorded individually on the daily record sheets and may be accurately transcribed onto the general ledger sheets by an efficient utilization of the device 10. Conversely, a quick scanning of the ledger sheets provides a daily record for the continuing activities to be accomplished on the next succeeding day. The general ledger sheets provide an overall compilation of the activities and proceedings of the business, and the device assures a rapid and accurate reference thereto.

Whereas, the present invention has been described in particular relation to the drawings attached hereto, it should be understood that other and further modifications, apart from those shown or suggested herein, may be made within the spirit and scope of this invention.

What is claimed is:

1. An apparatus for facilitating record keeping and comprising a base portion, a substantially flat surface provided for the base portion, latching clamp means provided along one edge of the base portion for removably securing a plurality of first recording sheets on the flat surface, a pair of substantially parallel spaced elongated slots provided in the flat surface, an upstanding post slidably disposed in each of said elongated slots, rack and pinion means provided in association with each of said elongated slots, said rack and pinion means being connected together for simultaneous movement, each of said upstanding pins being carried by one of said rack and pinion means whereby said upstanding pins are simultaneously moved in said elongated slots, a straight edge member extending between the upstanding pin members and movable simultaneously therewith along the plane of the flat surface in mutually parallel positions of movement, said straight edge slidably disposed on said upstanding pin members whereby the straight edge may be moved in a direction substantially perpendicular to the plane of the flat surface, adjustable housing means carried by the base portion, platen means provided on the adjustable housing for receiving second record keeping sheets therein, an elongated opening provided in the adjustable housing in the proximity of the platen means for permitting visual observation of one portion only of said second record keeping sheet, rule means carried by the adjustable housing in association with the elongated opening for facilitating analyzation of the information visible through the said elongated opening, and lighting means carried by the adjustable housing means for facilitaing viewing of the first and second record keeping sheets.

2. An apparatus for facilitating record keeping and comprising a base portion, a substantially flat surface provided for the base portion, means secured to the base portion for removably securing a plurality of first recording sheets on the flat surface, movable straight edge means provided on the base portion for cooperation with the first record keeping sheets for facilitating inscribing of information thereon or discovery of data included thereon, spaced upstanding post means slidably secured to the base portion for receiving the opposed ends of the straight edge means and permitting movement of the straight edge in a direction substantially perpendicular to the plane of the flat surface; means extending between the spaced post means and cooperating therewith to provide for simultaneous movement therebetween for maintaining the straight edge in mutually parallel positions during movement thereof along the plane of the flat surface, an angularly adjustable housing carried by the base portion, platen means provided on the adjustable housing for receiving second record keeping sheets therein, an elongated slot provided on the adjustable housing adjacent the platen means whereby a portion of the second record keeping sheet is visible therethrough, lighting means carried by the adjustable housing means for facilitating viewing of the first and second record keeping sheets.

References Cited by the Examiner

UNITED STATES PATENTS

| | | | |
|---|---|---|---|
| 1,559,459 | 10/25 | Rogers | 281—44 |
| 1,959,743 | 5/34 | Conner et al. | 281—44 X |
| 2,104,334 | 1/38 | Smith | 281—44 X |
| 2,115,331 | 4/38 | Ford | 120—34 |
| 2,127,711 | 8/38 | Baldauf | 120—32 X |
| 2,189,935 | 2/40 | Blomfield et al. | 281—1 |
| 2,617,386 | 11/52 | Kao et al. | 120—32 |

JEROME SCHNALL, *Primary Examiner.*

LAWRENCE CHARLES, *Examiner.*